(12) United States Patent
Pena

(10) Patent No.: US 10,948,003 B2
(45) Date of Patent: Mar. 16, 2021

(54) QUICK RELEASE TENSIONING DEVICE

(71) Applicant: Landscape Structures Inc., Delano, MN (US)

(72) Inventor: Felipe Pena, Southlake, TX (US)

(73) Assignee: Landscape Structures Inc., Delano, MN (US)

( * ) Notice: Subject to any disclaimer, the term of this patent is extended or adjusted under 35 U.S.C. 154(b) by 0 days.

(21) Appl. No.: 15/857,192

(22) Filed: Dec. 28, 2017

(65) Prior Publication Data

US 2018/0195548 A1 Jul. 12, 2018

Related U.S. Application Data

(60) Provisional application No. 62/443,064, filed on Jan. 6, 2017.

(51) Int. Cl.
*F16B 31/04* (2006.01)
*E04F 10/02* (2006.01)
*E04H 15/32* (2006.01)
*E04H 15/58* (2006.01)
*F16G 11/12* (2006.01)
*E04H 15/60* (2006.01)
*E04H 15/64* (2006.01)
*E04H 15/40* (2006.01)
*E04H 15/18* (2006.01)

(52) U.S. Cl.
CPC .............. *F16B 31/04* (2013.01); *E04F 10/02* (2013.01); *E04H 15/18* (2013.01); *E04H 15/322* (2013.01); *E04H 15/40* (2013.01); *E04H 15/58* (2013.01); *E04H 15/60* (2013.01); *E04H 15/64* (2013.01); *F16G 11/12* (2013.01)

(58) Field of Classification Search
CPC ....... E04H 15/64; E04H 15/58; E04H 15/322; E04H 15/32; E04H 15/60; E04F 10/02; F16B 31/04
USPC ........ 135/121–123, 141–142, 147, 161, 115, 135/117, 119, 120.2–120.4, 905, 907; 160/378, 328–329; 242/419.5, 419.8, 242/388.2; 52/63, 83, 222, 93.1–93.2
See application file for complete search history.

(56) References Cited

U.S. PATENT DOCUMENTS 2,723,673 A * 11/1955 Call ........................ E04H 15/46
135/140
2,928,403 A * 3/1960 Hoskins .................. E04H 15/28
135/116

(Continued)

FOREIGN PATENT DOCUMENTS

KR 101139907 B1 * 4/2012 ............ E04H 15/64

*Primary Examiner* — Noah Chandler Hawk
(74) *Attorney, Agent, or Firm* — Wesley W. Malherek; Kelly, Holt & Christenson PLLC

(57) ABSTRACT

A tensioning system for a shade structure is presented. The tensioning system comprises a shade membrane coupling portion configured to couple to a shade membrane of the shade structure. The tensioning system also comprises a movement axis, along which the shade membrane coupling portion moves. In a first direction, the shade membrane coupling portion applies tension to the shade membrane and, in a second direction, releases tension applied to the shade membrane. The tensioning system also comprises a force translation mechanism configured to receive a rotational force and translate it into linear movement of the shade membrane coupling portion along the movement axis in the first and second direction.

20 Claims, 15 Drawing Sheets

(56) References Cited

U.S. PATENT DOCUMENTS

| | | | | |
|---|---|---|---|---|
| 3,952,463 | A * | 4/1976 | Lane | E04H 15/34 |
| | | | | 52/63 |
| 5,655,340 | A * | 8/1997 | Pelsue | E04H 15/48 |
| | | | | 135/114 |
| 5,887,841 | A * | 3/1999 | Newberg | B63B 15/0083 |
| | | | | 114/102.12 |
| 6,691,723 | B2 * | 2/2004 | Godbersen | E04H 15/64 |
| | | | | 135/120.2 |
| 6,814,094 | B1 * | 11/2004 | Barber | E04H 15/322 |
| | | | | 135/119 |
| 6,874,518 | B2 * | 4/2005 | Porter | E04H 15/46 |
| | | | | 135/119 |
| 7,219,681 | B1 * | 5/2007 | Hamilton-Jones | E04H 15/322 |
| | | | | 135/119 |
| 8,991,413 | B2 * | 3/2015 | Arbeiter | E04H 15/64 |
| | | | | 135/119 |
| 2006/0174929 | A1 * | 8/2006 | Tseng | E04H 15/34 |
| | | | | 135/159 |
| 2006/0191564 | A1 * | 8/2006 | Connelly | E04H 15/44 |
| | | | | 135/121 |
| 2007/0028953 | A1 * | 2/2007 | Zanot | E04H 15/64 |
| | | | | 135/119 |
| 2007/0240746 | A1 * | 10/2007 | Chen | E04H 15/322 |
| | | | | 135/119 |

* cited by examiner

QUICK RELEASE TENSIONING DEVICE

CROSS-REFERENCE TO RELATED APPLICATIONS

The present application is based on and claims the benefit of U.S. Provisional Patent Application Ser. No. 62/443,064, filed Jan. 6, 2017, the content of which is hereby incorporated by reference in its entirety.

BACKGROUND

Shade structures are known and used in many outdoor settings for permanent or temporary protection from direct sunlight and/or other weather elements. A shade structure may consist of one or more membranes stretched over, or between support structures. For example, a shade structure may comprise a shade membrane stretched between different support poles.

SUMMARY

A tensioning system for a shade structure is presented. The tensioning system comprises a shade membrane coupling portion configured to couple to a shade membrane of the shade structure. The tensioning system also comprises a movement axis, along which the shade membrane coupling portion moves. In a first direction, the shade membrane coupling portion applies tension to the shade membrane and, in a second direction, releases tension applied to the shade membrane. The tensioning system also comprises a force translation mechanism configured to receive a rotational force and translate it into linear movement of the shade membrane coupling portion along the movement axis in the first and second direction.

DETAILED DESCRIPTION OF ILLUSTRATIVE EMBODIMENTS

Shade structures are common features in playground construction and design. A shade structure can be any one of a plurality of different configurations—for example stretched over a support frame, like an umbrella or a taught structure coupled between support elements, such as a series of columns. Many shade structures are designed to be permanent installations in outdoor environments, for example within a playground area. However, it is increasingly desired for shade structures to be at least semi-removable, for example such that shade membranes can be removed and stored in anticipation of a weather-related event. Some shade membranes, for example, are not designed to withstand significant snowfall, and are designed to be taken inside for the winter. Additionally, shade membranes may need to be brought down in advance of high wind situations, for example tornadoes and/or hurricanes. Therefore, it is increasingly desired that shade structures be constructed such that the shade membranes are more easily removed. At least some embodiments described herein illustrate shade membranes with quickly releaseable tension application systems, configured to more easily couple a shade membrane to a support structure and also to aid in removal of the shade membrane quickly.

As described herein, a shade membrane comprises any material configured to be stretched between, or over, a support structure and provide at least some protection from sunlight. Such membranes may comprise, for example, cloth, fabric, a polymeric material, a plastic, a metal, or any other suitable material. However, in other embodiments, a shade membrane can also comprise a clear material, for example designed only to provide protection from weather elements such as rain or snow, but configured to allow a viewer to at least partially see through the material. Other appropriate materials are also envisioned herein, such as those providing UV protection. Therefore, at least some embodiments described herein relate to substantially durable shade structures that can be assembled and taken down as needed, but can also withstand substantially year-round exposure to weather-related elements in at least some climates.

Figure 1:
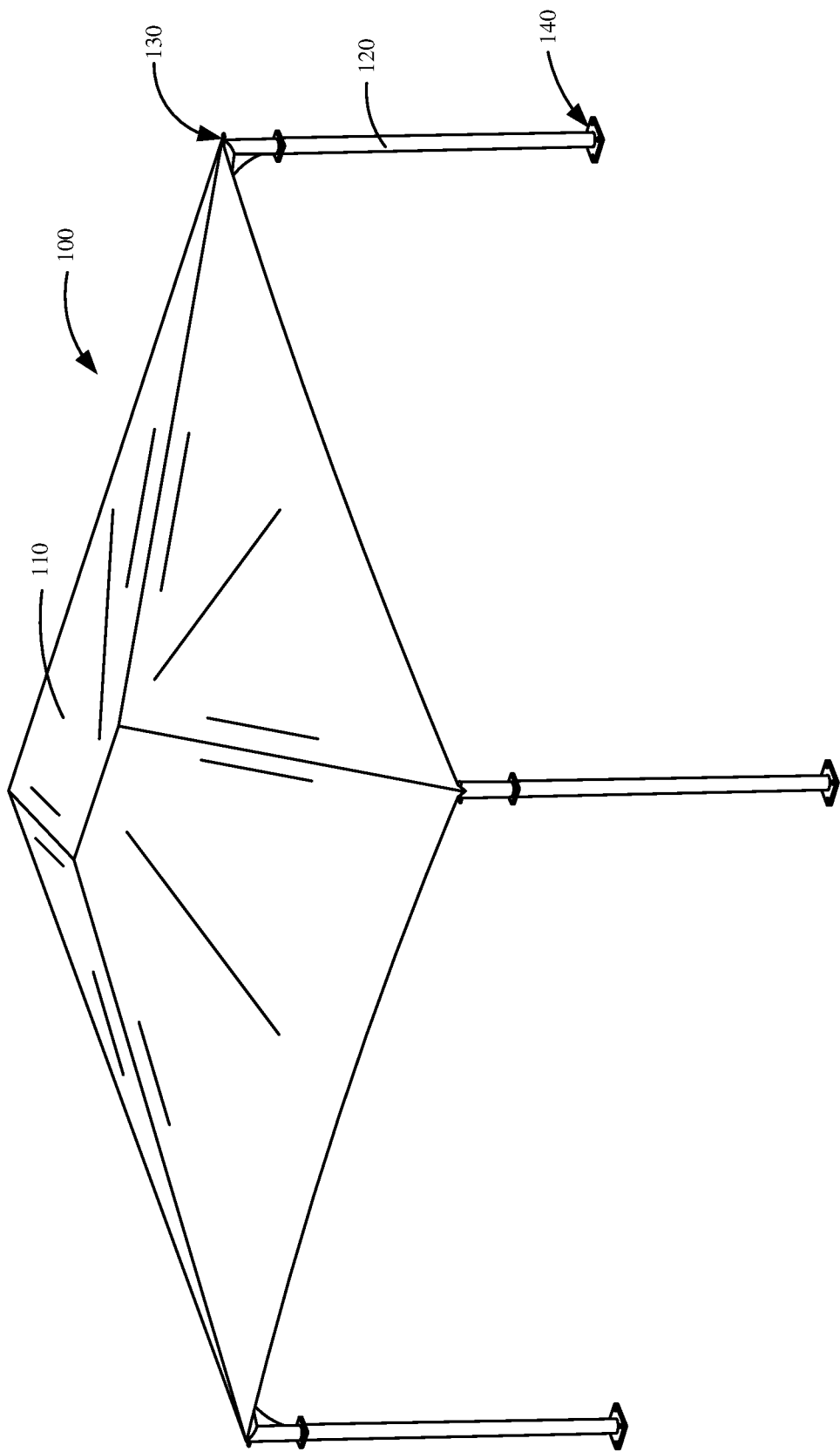
FIG. 1 illustrates an example shade structure in a playground environment in accordance with an embodiment of the present invention.

FIG. 1 illustrates an example shade structure in a playground environment in accordance with an embodiment of the present invention. FIG. 1 illustrates a shade structure 100 comprising a membrane element 110 stretched between supports 120. In one embodiment, supports comprise columns. In another embodiment, supports comprise poles. Supports 120, in one embodiment, are configured for permanent installation within an outdoor environment at installation points 140. Permanent installation may comprise at least a portion of the support extending below a ground surface.

Supports 120 are configured to couple to one or more shade membranes 110 at coupling points 130. One or more coupling points 130 may comprise a quick release coupling portion. Additionally, while FIG. 1 illustrates a four-cornered single shade membrane 110, it is also envisioned that multiple shade membranes could be installed, and other shapes of membranes could be installed, for example a three-pointed, five-pointed, or other polygonal-shaped design. As illustrated in FIG. 1, in one embodiment, shade membrane element 110 is configured to stretch, or be pulled taught under an applied tension, such that it will not flap or move significantly when experiencing wind shear. In at least one embodiment, shade membrane elements 110 are therefore configured to have some flexibility, enabling them to be stretched between supports 120. However, in one embodiment, shade membrane element 110 is sufficiently rigid and configured to withstand tension. As tension may cause shade membrane element 110 to wear over time, it is desired to be able to easily remove individual shade elements 110 from connection points 130 on supports 120 such that repair or replacement can be conducted.

Figure 2:
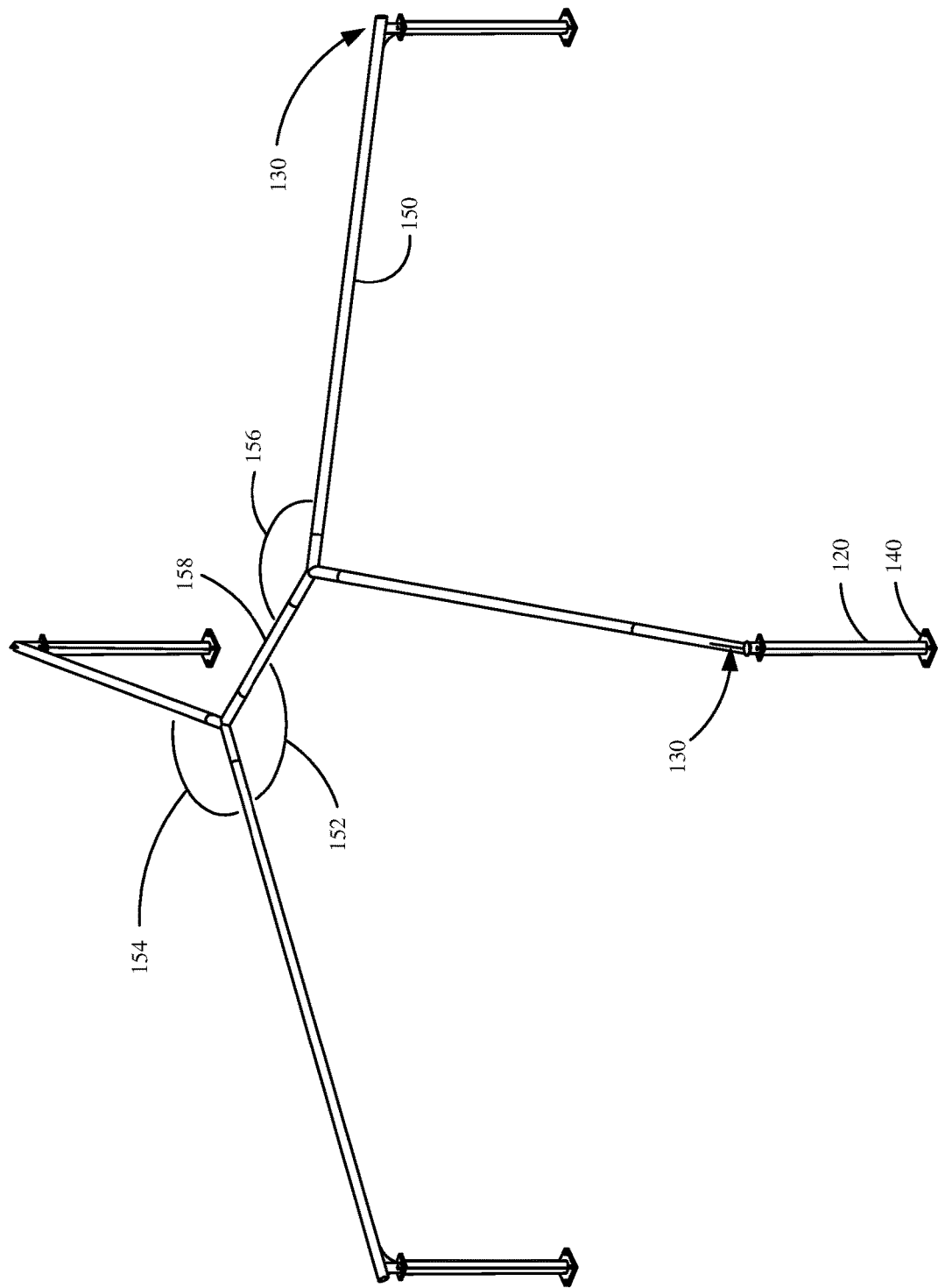
FIG. 2 illustrates a shade structure frame in accordance with an embodiment of the present invention.

FIG. 2 illustrates a shade structure frame in accordance with an embodiment of the present invention. FIG. 2 illustrates a shade structure, for example similar to that of FIG. 1, with membrane 110 removed for convenience. FIG. 2 comprises a plurality of support structures, mounted at mounting points 120. Extending between support structures, in one embodiment, are a plurality of rafters, configured to withstand the weight of, and support, shade membrane 110. In one embodiment, four rafters are configured to extend from four support structures 120, such that they meet and couple to a frame element 158.

Rafters 150 may couple to frame component 158 such that an angle 156 of about 127° is created between frame element 158 and rafter 150, in one embodiment. Additionally, between adjacent rafters, an angle 154 may be created, which, in one embodiment, may comprise about 106°. Additionally, rafters 150 may couple to shade element at an incline, with an angle 152 relative to normal. In one embodiment, angle 152 comprises about 157.5°. As illustrated in FIG. 2, coupling mechanisms 130 may be coupled to one or more of rafters 150.

In one embodiment, each rafter 150 comprises a coupling mechanism 130. However, some or all rafters 150 may also comprise a quick release tensioning system. For example, coupling the first corner of a shade membrane to a support pole may not require much effort, while coupling the last corner of a shade membrane to a support structure may require significant effort to apply the necessary tension. Therefore, in one embodiment, not every rafter 150 comprises a quick release tensioning mechanism. However, it is expressly contemplated that any number of tensioning systems may be used, up to an including the number of rafters 150 within a structure. In one embodiment, rafters 150 and support poles 120 comprise steel, however other suitable durable materials are also envisioned.

Figure 3:
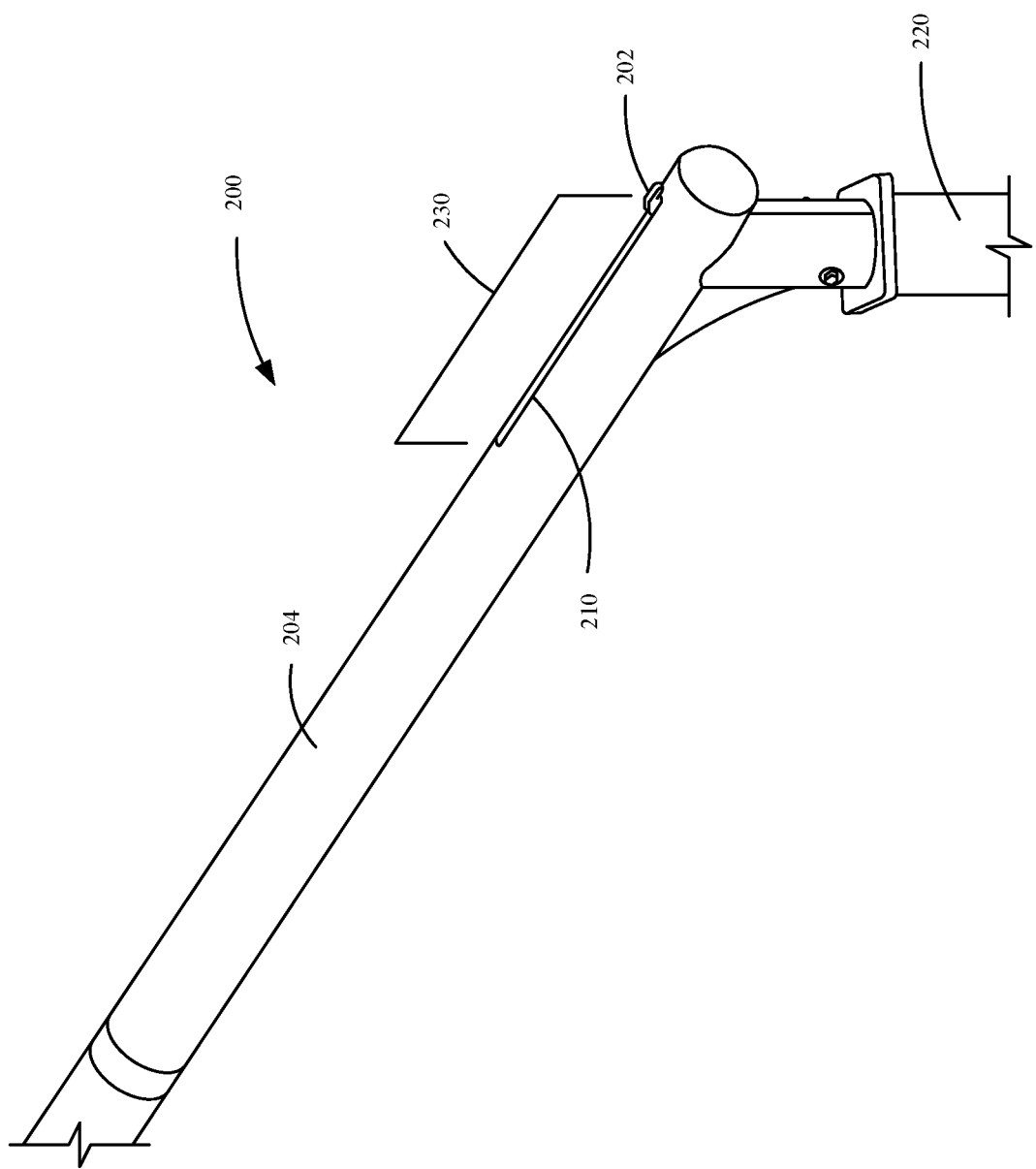
FIG. 3 illustrates a tensioning system for a shade structure frame in accordance with an embodiment of the present invention.

FIG. 3 illustrates a tensioning system for a shade structure in accordance with one embodiment of the present invention. As illustrated in FIG. 3, in one embodiment, tensioning system 200 is configured to be installed within a rafter 204. However, in another embodiment, tensioning system 200 may replace a rafter 204, for example. Rafter 204 may be configured to couple to a support pole 220, in one embodiment.

Tensioning system 220 may comprise a movable mechanism 202, that moves along a movement axis defined by movement slot 210. In one embodiment, movement slot 210 has a length 220. As illustrated in FIG. 3, in one embodiment, moveable mechanism 202 comprises a hook shaped structure configured to receive a portion of a shade membrane, and move along slot 210 applying tension as it moves away from a center of the shade structure and towards an end of rafter 204. In at least one embodiment, tensioning system 200 is also configured to operate in reverse, such that hook 202 is configured to move away from an end of rafter 204, towards a center of a shade structure quickly, releasing tension applied to a shade membrane. The tension that can be applied and released can comprise a portion of, or all of attention corresponding to length 220.

Figure 4:
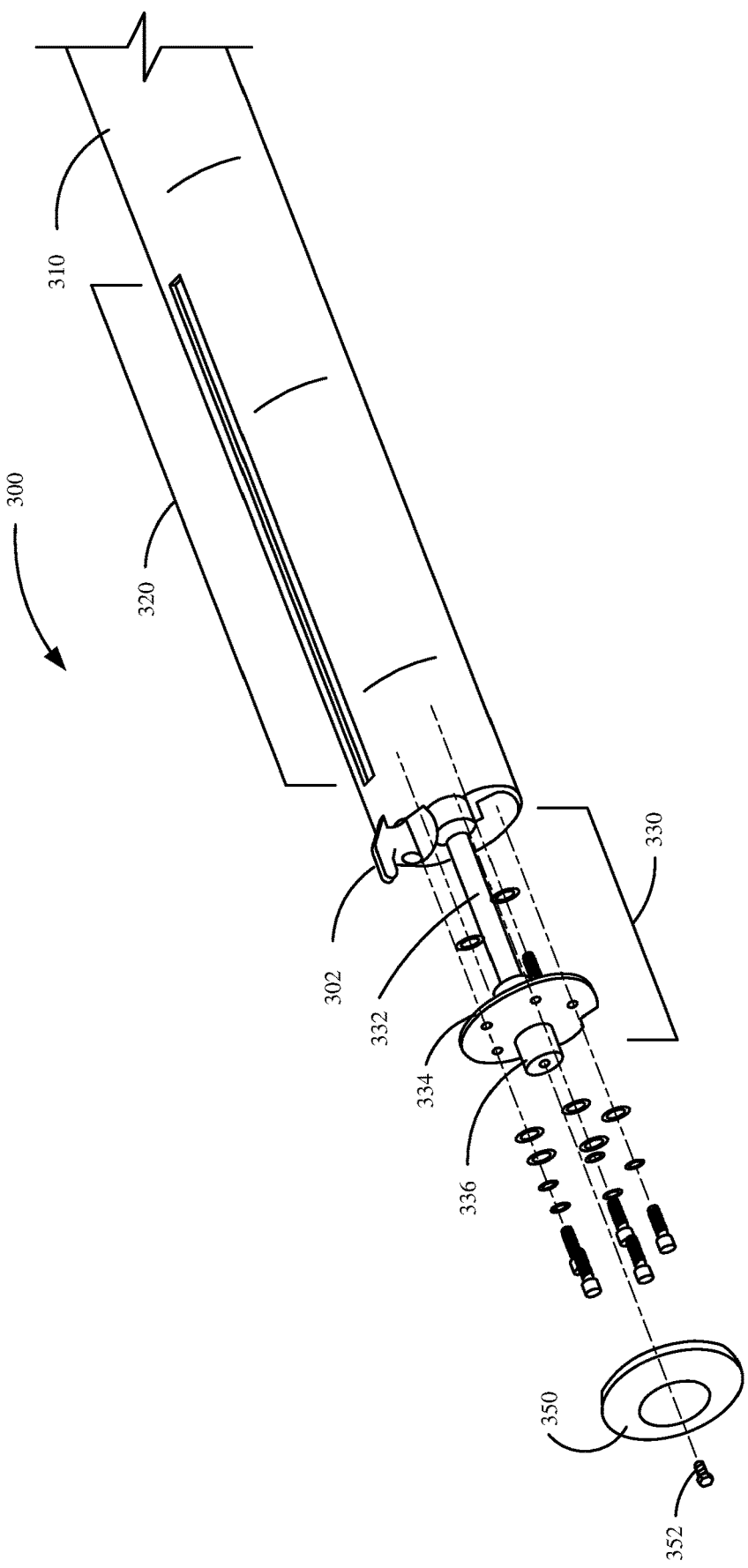
FIG. 4 illustrates an exploded view of a tensioning system for a shade structure frame in accordance with an embodiment of the present invention.

FIG. 4 illustrates an exploded view of a tensioning system for a shade structure frame in accordance with one embodiment of the present invention. As illustrated in FIG. 4, system 300 is configured to be installed within a rafter 310. In one embodiment, an internal sleeve assembly is configured to be installed within rafter 310, which is then configured to receive system 300. Internal sleeve assembly may comprise a length corresponding to the length of slot 320, in accordance with one embodiment. However, internal sleeve assembly may be longer or shorter than slot 320, in order to accommodate necessary components.

In one embodiment, assembly 300 comprises a cap 350 configured to seal internal sleeve assembly within rafter 310 such that assembly 300 is accessible when tension needs to be applied or removed, but inaccessible otherwise, limiting the risk of tampering. Cap 350 may be coupled using fastener 352. In one embodiment, movable component 302 is configured to move along the length of slot 320, when movement system 330 is actuated. In one embodiment, movement system comprises a threaded member 332 coupled to a plate 334 coupled to a rotatable mechanism 336. In one embodiment, rotation of rotatable mechanism 336 is translated into linear motion of movable element 332 using threaded member 332. In one embodiment, threaded member 332 comprises an ACME screw, while rotatable member 336 comprises a hexagon socket head cap screw.

Figure 5A:
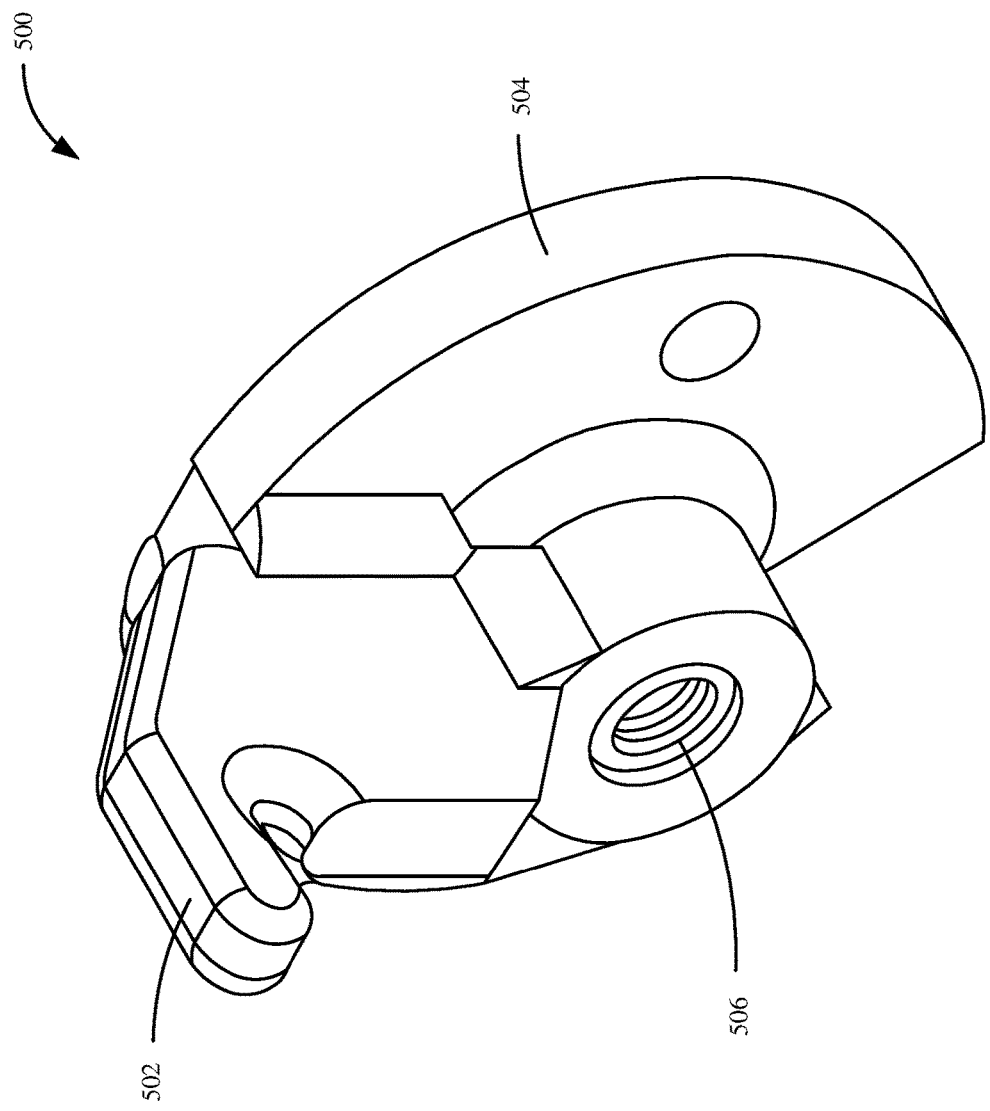
FIGS. 5A and 5B illustrate component views of a tensioning system for a shade structure in accordance with an embodiment of the present invention.
Figure 5B:
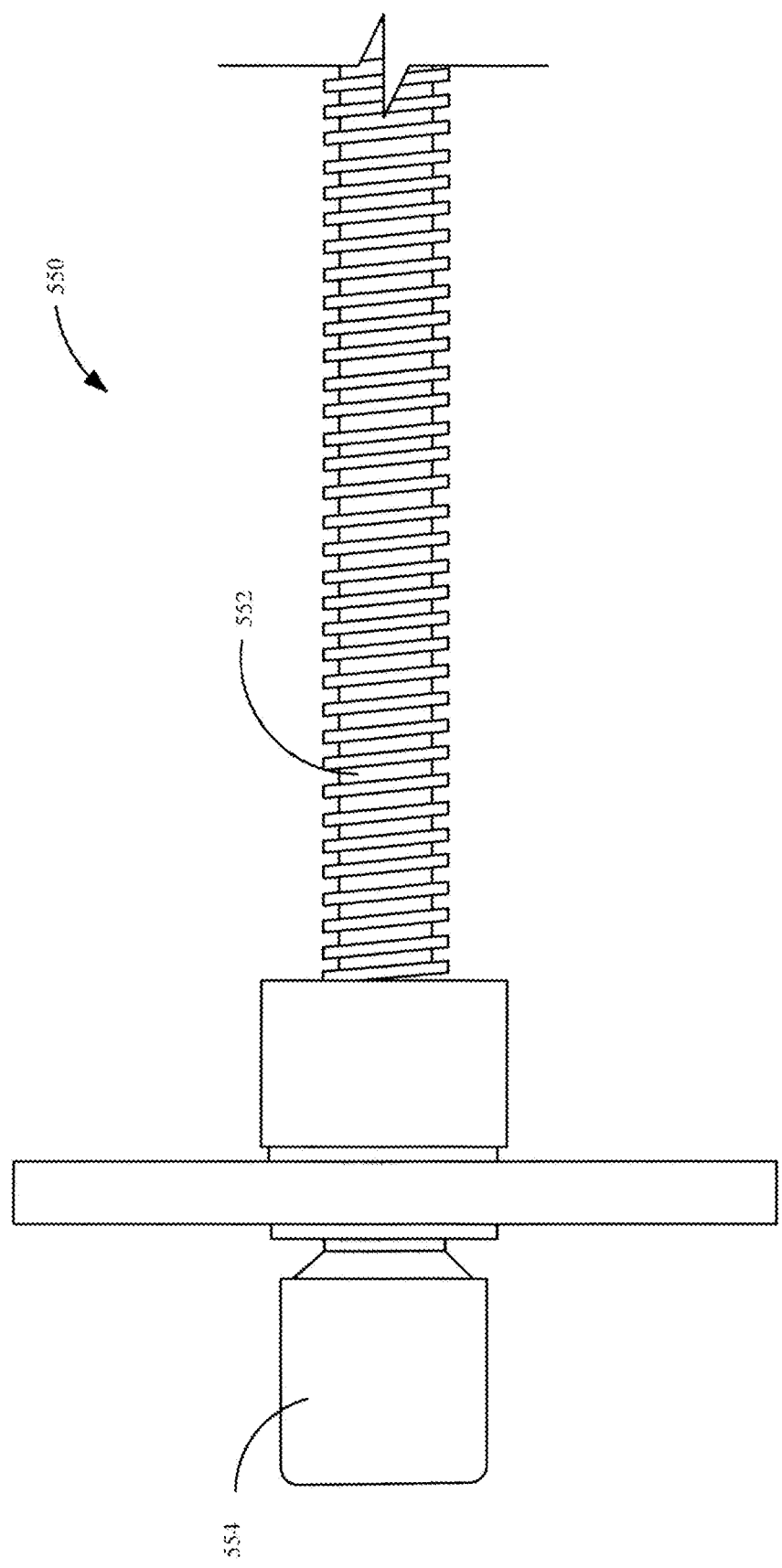

FIGS. 5A and 5B illustrate component views of a tensioning system for a shade structure in accordance with an embodiment of the present invention. As illustrated in FIG. 5A, tensioning system comprises a plate 504 coupled to a hook 502. Movable element 500 is configured to couple to threaded element 550, an example of which is illustrated in FIG. 5B, at coupling point 506. Rotatable element 554, therefore, is configured to rotate threaded member 552, causing movable element 500 to move linearly along a length of threaded element 552. In one embodiment, threaded element 552 comprises an ACME screw which may provide improved durability over other potential threaded elements.

In one embodiment, plate 504 and hook 502 comprise a single component. In another embodiment, plate 504 and hook 302 comprise separate elements that can be assembled into moveable element 500.

Figure 6:
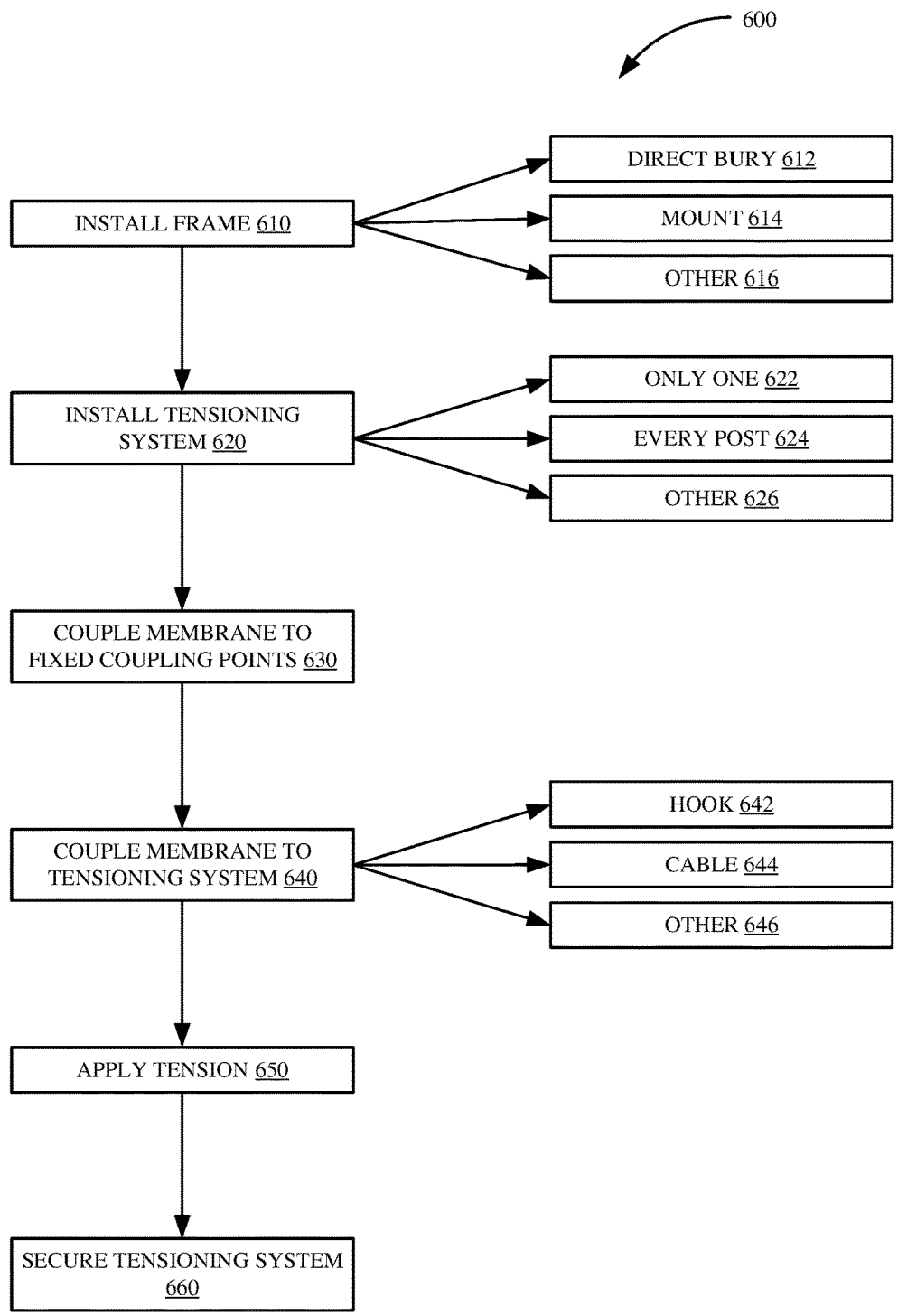
FIG. 6 illustrates a method of assembling a shade structure in accordance with an embodiment of the present invention.

FIG. 6 illustrates an example method of assembling a shade structure in accordance with an embodiment of the present invention. Method 600 may be useful in order to install a shade structure with a quick release tensioning device. However, in other embodiments, operating method 600 in reverse, or at least partially in reverse, may allow for quick removal of shade elements in the event of a weather event, repair, replacement, etc.

In block 610, a frame is installed. Installing a frame may comprise using a direct bury method, as indicated in block 612, or another mounting mechanism, as illustrated in 614 of support structures in a permanent location. Installing a frame may also comprise other steps, as indicated in block 616, for example, couple rafters to support structures, and arranging rafters into a desired shape to support a shade membrane.

In block 620, a tensioning system is installed. In one embodiment, a single tensioning system is installed within a single rafter of a shade structure, as indicated in block 622. In another embodiment, a tensioning system is installed within every rafter of a shade system, as indicated in block 624. Other configurations can also be used, as indicated in block 626, for example, including a tensioning system in less than every post of a shade structure, but more than a single post.

In block 630, a membrane is coupled to fixed coupling points. For example, a membrane may first be coupled to a center post of a shade structure, or another permanent coupling point. For example, a shade structure may include one or more fixed coupling points that are configured with non-movable elements, such that, once coupled, that portion of a shade membrane is configured to remain in place. However, in at leash some shade structure systems, for example that where every support comprises a tensioning system, there may be no fixed coupling points, and step 630 may be omitted.

In block 640, a membrane is coupled to a tensioning system. In one embodiment, coupling a membrane to a tensioning system comprises coupling a portion of the membrane directly to a movable element, such as a hook, as indicated in block 642. In another embodiment, shade membrane comprises a cable element, such as steel cable, along an outer perimeter of the shade membrane, which is coupled directly to a tensioning system, as indicated in block 644. However, other configures are also envisioned as indicated in block 646.

In block 650, tension is applied. In one embodiment, applying tension comprises rotating a rotationally movable object coupled to a threaded membrane, such that applying the rotational force causes linear movement of a movable element coupled to a membrane system to move. As the movable element moves, the shade membrane may be stretched, applying tension.

In block 660, the tensioning system is secured. Securing a tensioning system may comprise ensuring that the tensioning system can apply no additional tension, nor release additional tension during an operational timeframe. Additionally, securing tensioning system may also comprise applying safety features, such that tensioning system cannot be tampered with by a user of the shade structure, for example an endcap, or covering, such that the tensioning system cannot be readily accessed without suitable tools.

FIGS. 7A-7H illustrate an example installation sequence for a shade structure in accordance with an embodiment of the present invention.

Figure 7A:
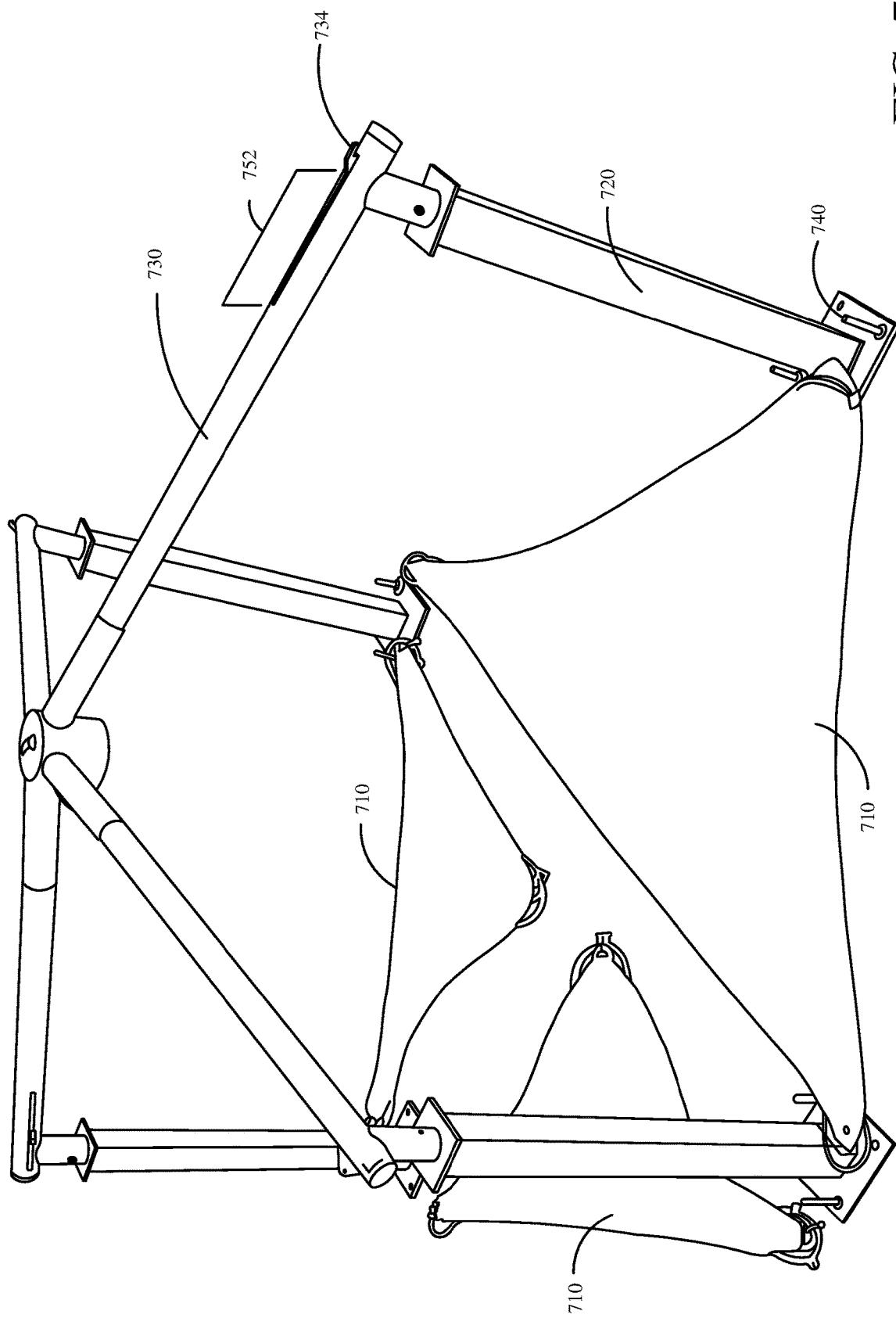
FIGS. 7A-7H illustrate an example installation sequence for a shade structure in accordance with an embodiment of the present invention.

In FIG. 7A, a plurality of shade membranes 710 are illustrated as ready to couple to rafters 730. Rafters 730 comprise a portion of a frame also consisting of supports 720 coupled at mounting location 740. As illustrated in FIG. 7A, a tensioning system is installed in one of the rafters 730, and comprises a movable mechanism 734 configured to move along a movement axis 732.

Figure 7B:
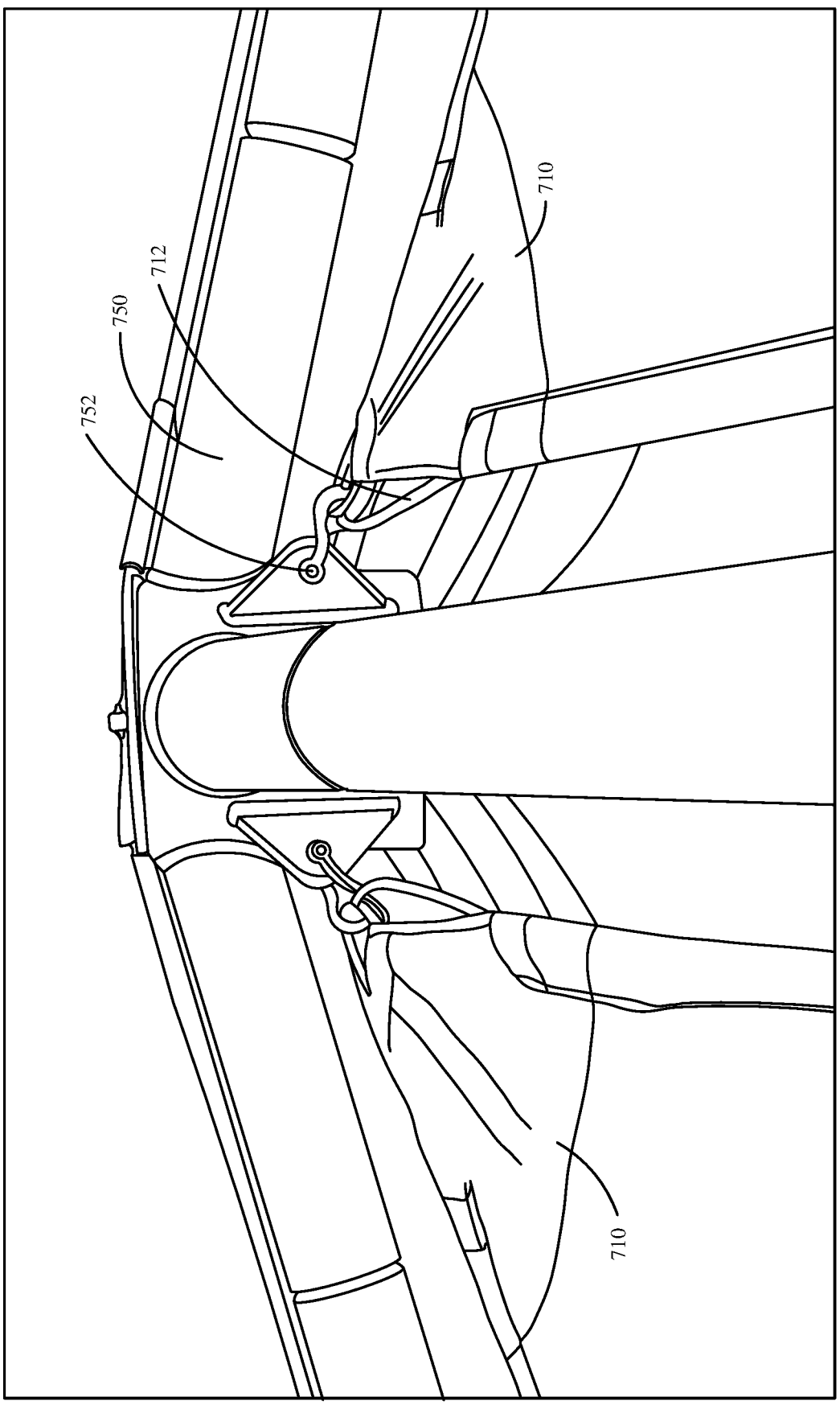

FIG. 7B illustrates an initial coupling of shade membranes 710 to a frame using coupling mechanism 712. Coupling mechanism 712 may couple to the frame at coupling point 752, in accordance with one embodiment of the present invention.

Figure 7C:
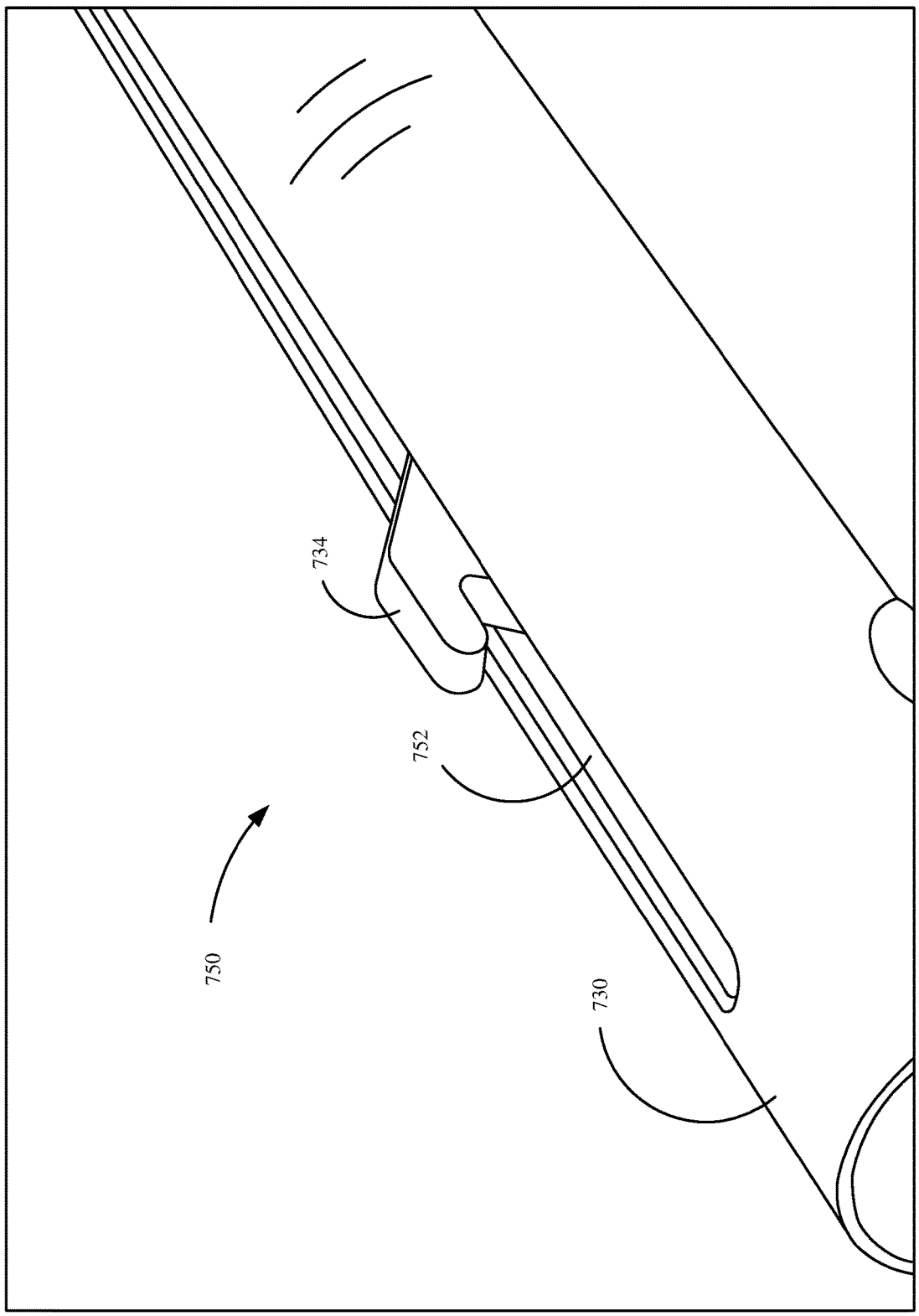

FIG. 7C illustrates a view of tensioning mechanism 750, which comprises movable mechanism 734 moving within slot 732 of rafter 730.

Figure 7D:
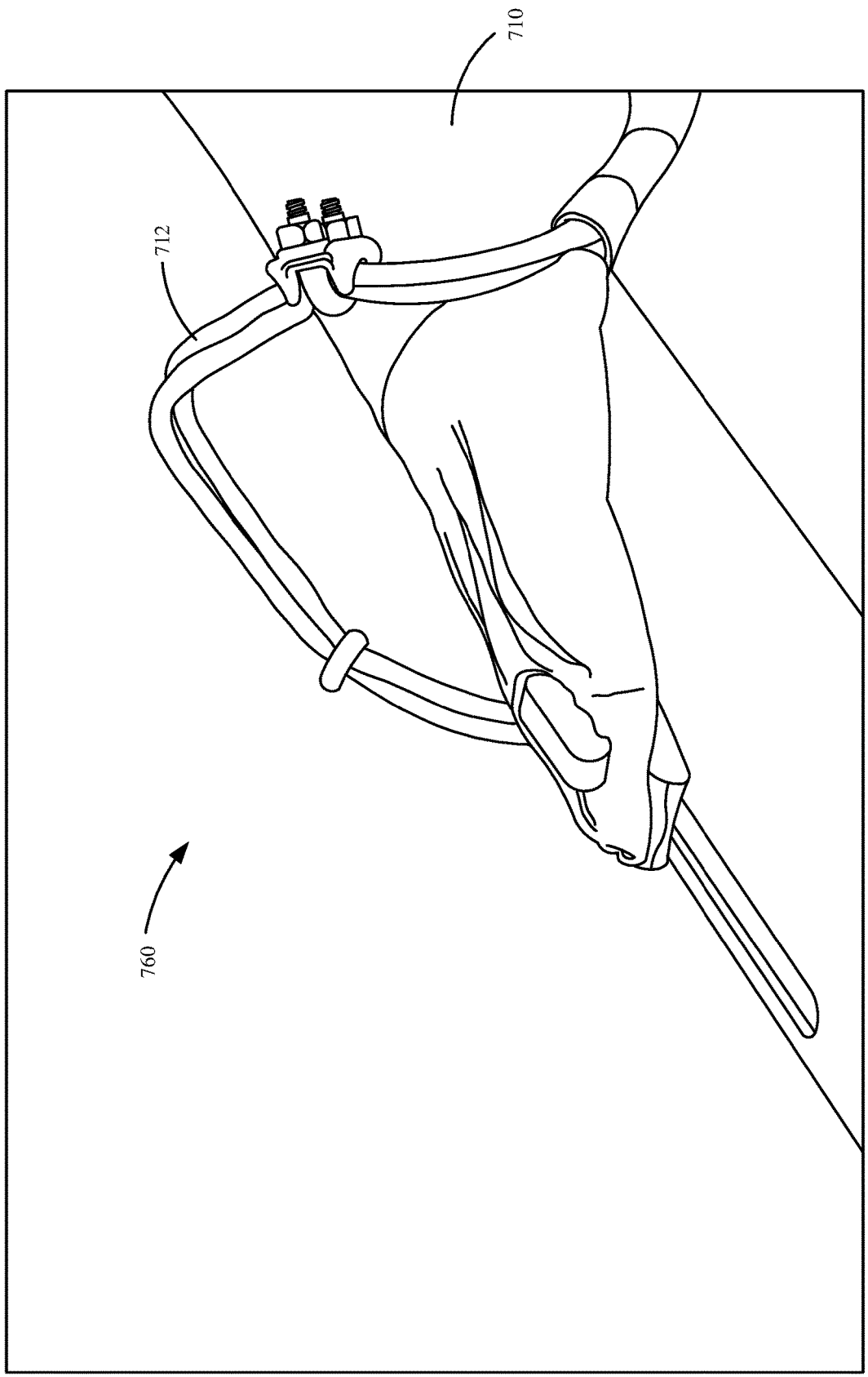

FIG. 7D illustrates coupling of a shade membrane 710 to a movable mechanism 734. As illustrated in FIG. 7D, in one embodiment, shade membrane 710 comprises a receiving portion, for example a hole, or indentation, configured to receive movable mechanism 734. Additionally, cables 712 may also be configured to couple to movable mechanism 734, for additional stability, for example.

Figure 7E:
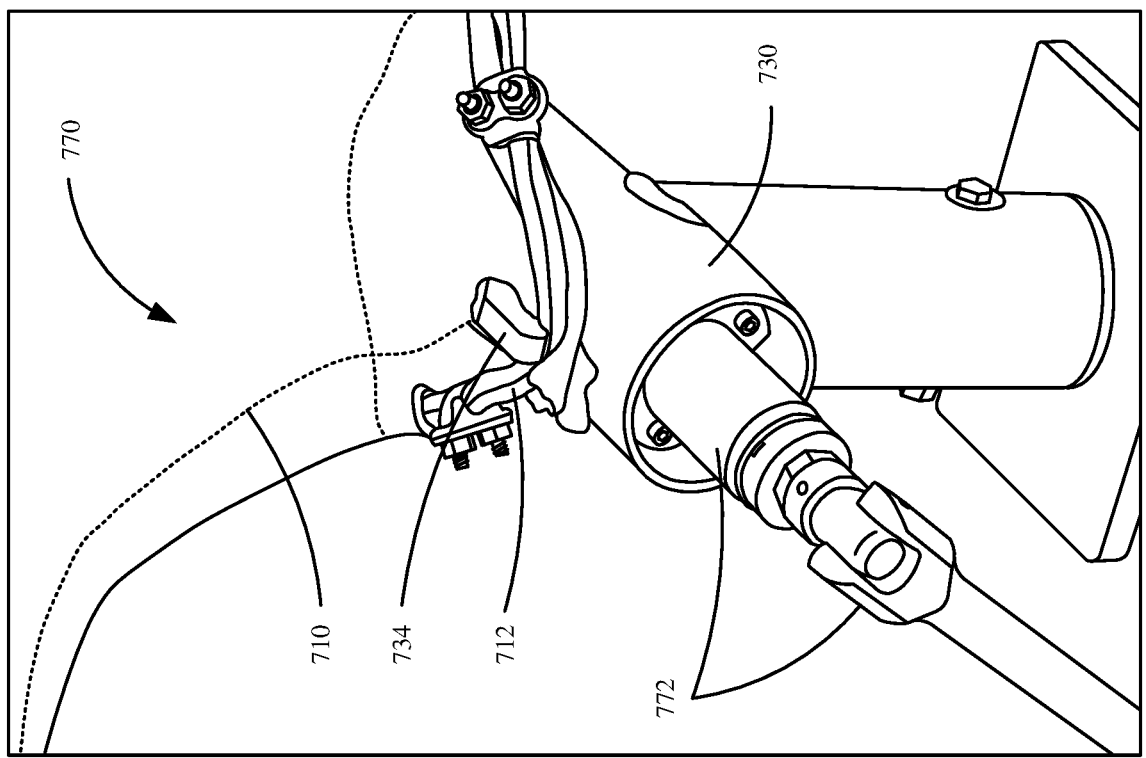

FIG. 7E shows a step 770, wherein cables 712 and shade membrane 710 have been secured around movable mechanism 734, and tension is being applied using a tensioning system 772. In one embodiment, as illustrated in FIG. 7E, rotational movement of tensioning system 772 causes movable mechanism 734 to move linearly along a length of rafter 730.

Figure 7F:
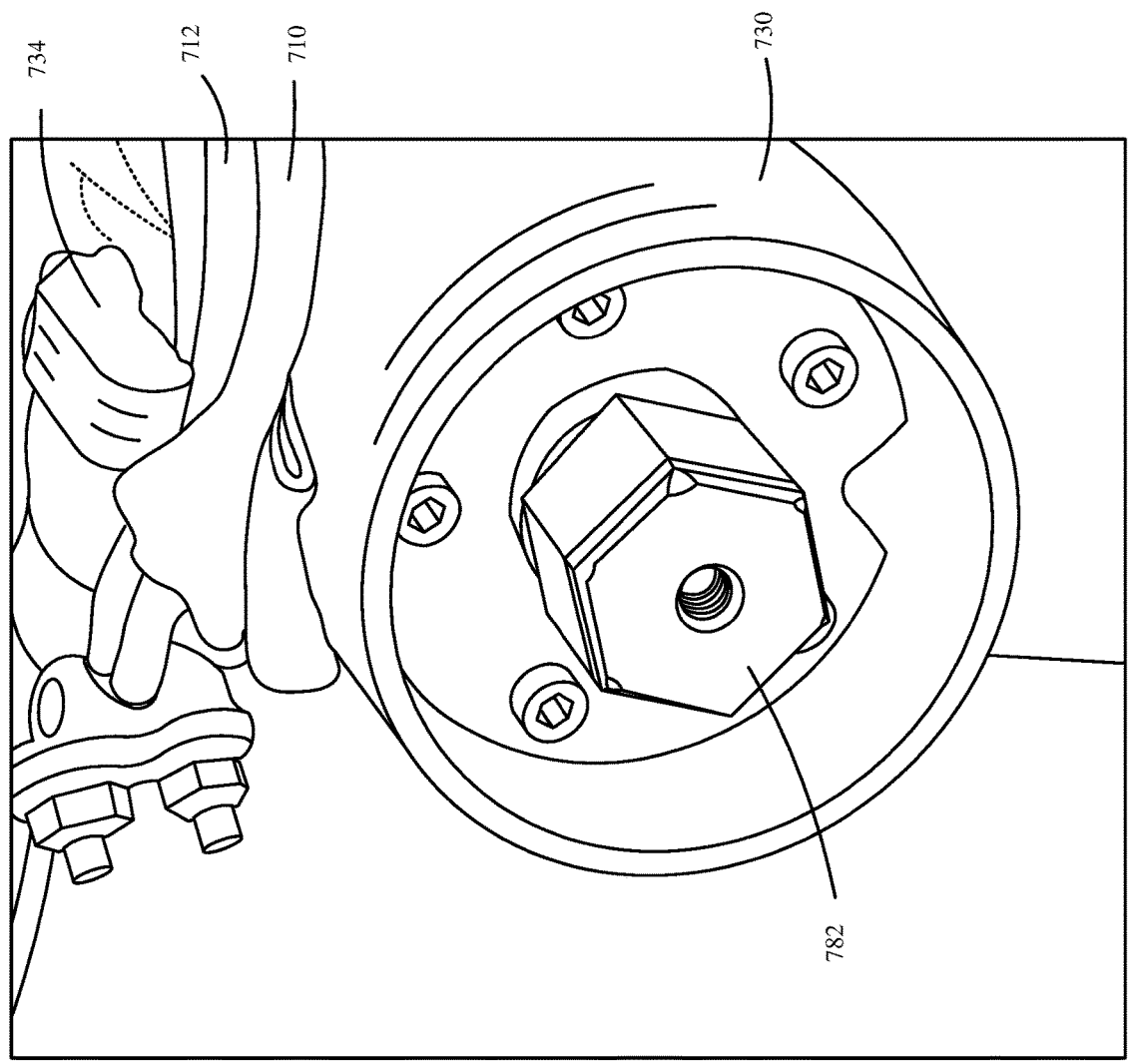

FIG. 7F illustrates a step 780, wherein tension has been applied to shade membrane 710 and cable 712, by moving mechanism 734. As illustrated, tensioning system 782 has substantially reached an end of the length of rafter 730.

Figure 7G:
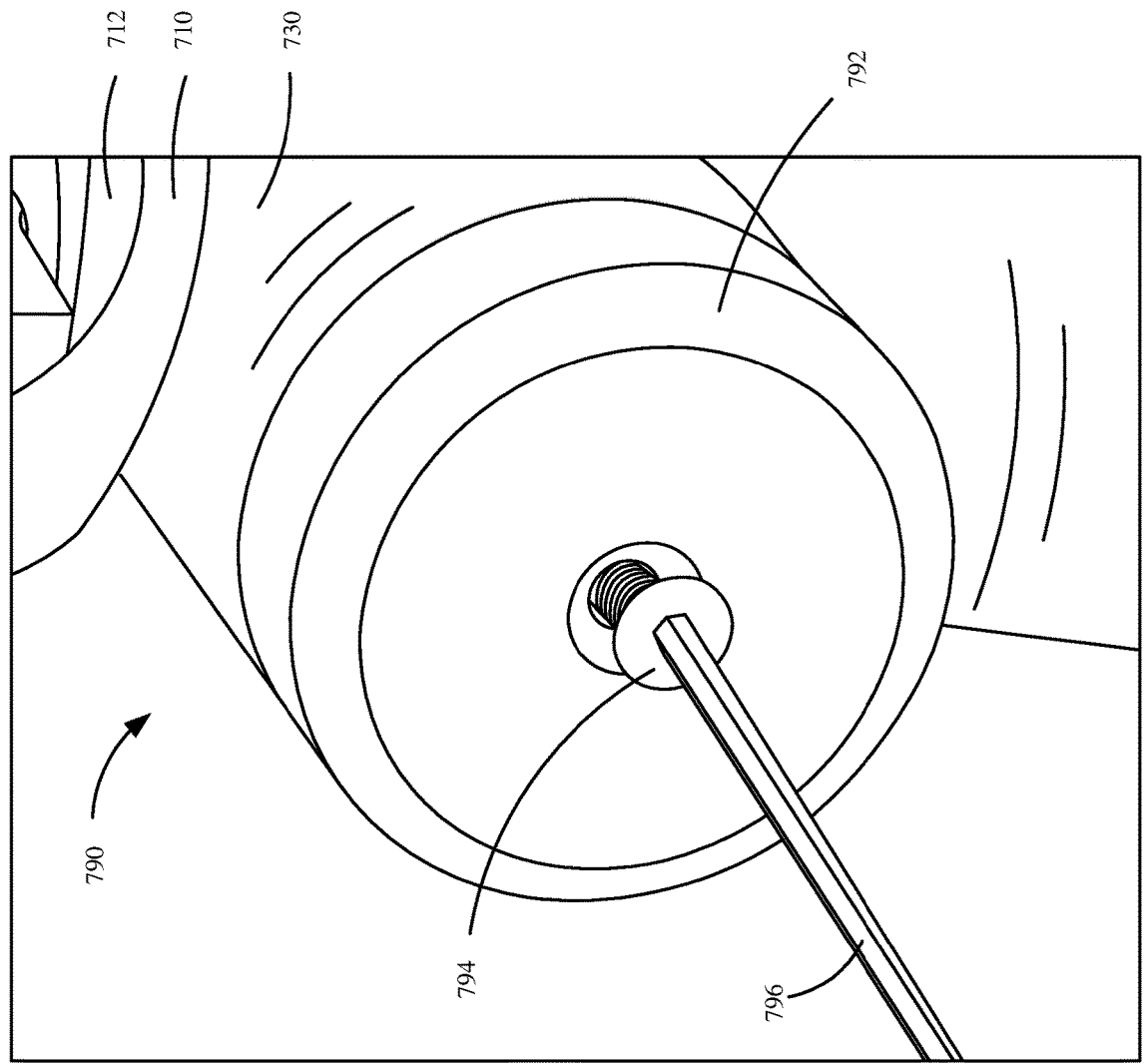

As illustrated in FIG. 7G, in step 790, a cap 792 is applied to rafter 730, and a fastening mechanism 774 is applied using, a tool 796.

Figure 7H:
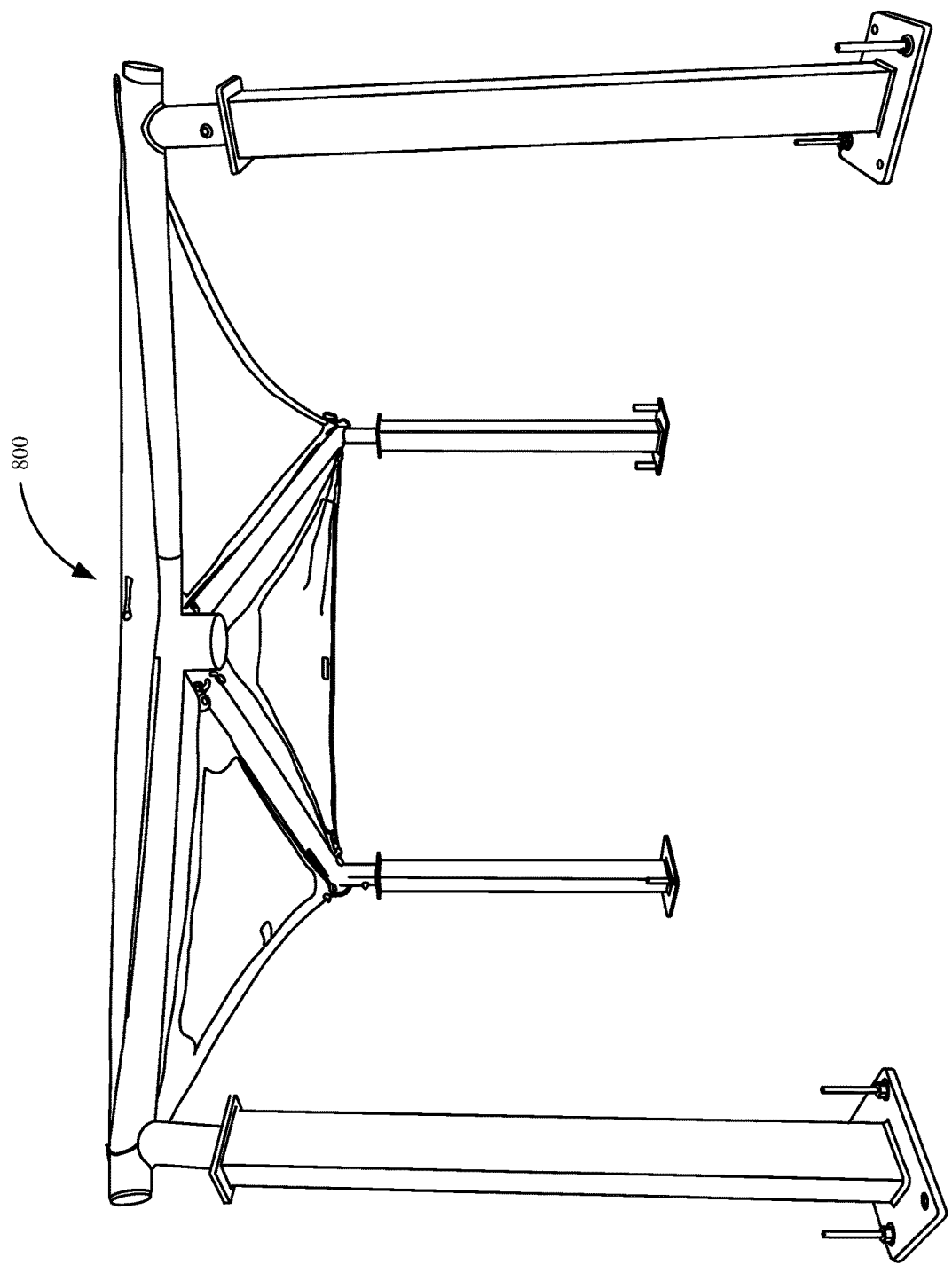

As illustrated in FIG. 7H, using the steps described herein, a shade system 800 can be constructed using one or more shade membranes 710 coupled between one or more support structures 720 at coupling point 730 using one or more tensioning systems.

While embodiments have been described and illustrated herein concerning a tensioning system located within a rafter of a shade system, it is also expressly contemplated that the tensioning system could be located elsewhere. For example, in one embodiment the tensioning system is installed within a support structure of the shade structure. These, and other configurations, are also contemplated herein.

Although the present invention has been described with reference to preferred embodiments, workers skilled in the art will recognize that changes may be made in form and detail without departing from the spirit and scope of the invention.

What is claimed is:
1. A shade structure, comprising:
   a frame that comprises:
      four supports, each support being coupled to a surface at an anchor location;
      four rafters, each rafter coupled to one of the supports at one end and extending therefrom, the four rafters at least partially defining one or more surface areas over which two membranes expanse; and
   a frame element having:
      a first end coupled to a first set of two of the four rafters at ends of the first set of two rafters, and opposite the ends of the first set of two rafters coupled to the supports, and wherein every angle measured between the frame element and either one of the first set of two of the four rafters is greater than 90 degrees; and
      a second end coupled to a second set of two of the four rafters at an end of the second set of two rafters, and opposite the ends of the second set of two rafters coupled to the supports, and wherein every angle measured between the frame element and either one of the second set of two of the four rafters is greater than 90 degrees; and
   a tensioning system that couples the two membranes to a particular one of the four rafters, the tensioning system being substantially concealed within the particular one of the four rafters, and wherein the tensioning system comprises:
      a movement slot formed in the particular one of the four rafters, and wherein a movable element of the tensioning system is removably attached to the membrane and extends from and moves along the movement slot, and wherein when the movable element moves along the movement slot in a first direction then the tensioning system applies tension to the two membranes, and wherein when the moveable element of the tensioning system moves along the movement slot in a second direction then the tensioning system releases tension applied to the two membranes; and
      a rotatable mechanism that, when rotated, causes said movement of the moveable element of the tensioning system along the movement slot in said first and second directions.

2. The shade structure of claim 1, wherein a portion of the rotatable mechanism is hidden behind a removeable cap attached to the particular one of the four rafters.

3. The shade structure of claim 1, wherein the movable element is attached to the rotatable mechanism.

4. The shade structure of claim 1, further comprising:
a cap installed over an end of the rotatable mechanism such that, when the cap is installed, the rotatable mechanism is at least substantially inaccessible.

5. The shade structure of claim 4, wherein the cap further comprises a cap fastening mechanism.

6. The shade structure of claim 1, wherein the rotatable mechanism comprises a threaded member.

7. The shade structure of claim 1, wherein the particular one of the four rafters is configured to receive a removable cap that conceals at least a part of the rotatable mechanism, and wherein none of the other three rafters includes a same or similar removable cap.

8. The shade structure of claim 1, wherein the moveable element comprises a hook.

9. A method of assembling a shade structure, the method comprising:
installing a frame on a surface, the frame including four rafters each having a first end connected to a separate support pole, and each rafter also having a second end attached to another portion of the frame so as to form an angle of greater than 90 degrees measured between the second end of the rafter and the another portion;
supporting a shade membrane on the frame through an attachment of the shade membrane to the frame at no more than one moveable tensioning point, the one moveable tensioning point being part of a movable element of a tensioning system that is substantially concealed within a portion of the frame; and
supporting a second shade membrane on the frame through an attachment of the shade membrane to the frame at no more than one moveable tensioning point, the one moveable tensioning point being part the moveable element.

10. The method of claim 9, wherein installing the frame further comprises:
coupling each support pole to the surface; and
coupling the first end of each rafter to one of the support poles.

11. The method of claim 10, wherein the tensioning system is installed within one of the plurality of rafters.

12. The method of claim 9, wherein installing the frame comprises a substantially permanent installation of the separate support poles within an outdoor environment.

13. The method of claim 9, wherein supporting the shade membrane on the frame further comprises directly coupling the shade membrane to a moveable hook component of the tensioning system.

14. The method of claim 9, and further comprising:
securing the tensioning system within the frame such that it is substantially inaccessible.

15. The method of claim 9, wherein supporting the shade membrane on the frame further comprises rotating a tensioning mechanism.

16. The method of claim 15, wherein the tensioning mechanism is a threaded shaft.

17. The method of claim 9, wherein the shade membrane is substantially triangular in shape.

18. A shade structure comprising:
three supports displaced from one another and arranged so as to be at least substantially perpendicular to a ground level;
three rafters each coupled at a first end to a different one of the three supports, and wherein a second end of each of the three rafters is attached to another portion of the shade structure so as to form only angles of greater than 90 degrees measured between the rafter and the another portion;
a shade membrane connected to or proximate to at two of the three rafters in at least three different locations;
a second shade membrane connected to or proximate to at least two of the three rafters in at least three different locations; and
a tensioning system substantially concealed within one of the three rafters, the shade membrane and second shade membrane being connected to the tensioning system, and wherein the tensioning system is one of said at least three different locations and the only one of said locations that is adjustable so as to change a level of tension applied to the two shade membranes.

19. The shade structure of claim 18, wherein a portion of the tensioning system extends through a slot formed in the rafter within which the tensioning system is substantially concealed.

20. The shade structure of claim 18, wherein the tensioning system includes a threaded member that rotates so as to add or remove tension to the shade membrane.

* * * * *